March 16, 1954     R. J. BRITTAIN, JR., ET AL     2,672,382

JOURNAL BOX

Filed Dec. 8, 1951

INVENTORS;
RICHARD J. BRITTAIN, JR.,
AND CHARLES W. KIEN.
By Edward H. Goodrich
HIS ATTORNEY.

Patented Mar. 16, 1954

2,672,382

UNITED STATES PATENT OFFICE 2,672,382

JOURNAL BOX

Richard J. Brittain, Jr., Berkeley Heights, and Charles W. Kien, Scotch Plains, N. J., assignors to General Motors Corporation, Detroit, Mich., a corporation of Delaware Application December 8, 1951, Serial No. 260,604

18 Claims. (Cl. 308—41)

This invention relates to journal boxes and particularly to an end thrust arrangement for yieldably cushioning the end thrust of an axle in a railway journal box.

An object of this invention is to provide an improved thrust construction for yieldably absorbing and limiting the endwise thrust of an axle. Another object is to provide an improved thrust arrangement having simply constructed parts which may be quickly and easily installed in and demounted from a journal box. To these ends and also to improve generally upon devices of this character, the invention consists in the various matters hereinafter described and claimed. In the drawings, Figure 1 is a vertical sectional view of a journal box, the section being taken on line 1—1 of Figure 3.

Figure 3:
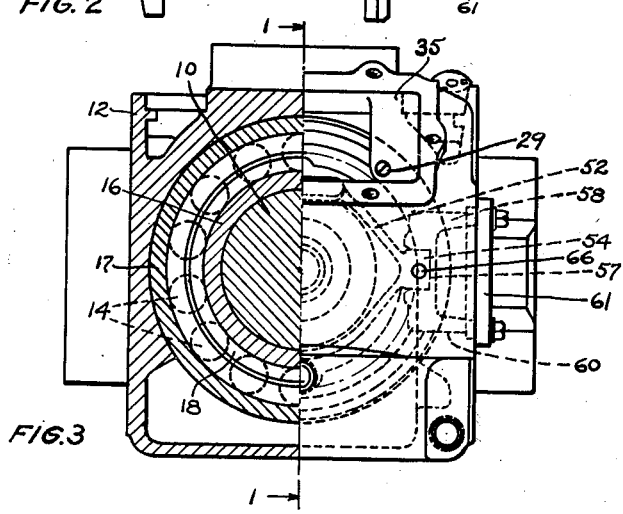
Figure 3 is a fragmentary front end view of the journal box broken away to show interior parts in vertical cross section.

An axle 10 is supported in a journal box 12 for rotation and endwise movement by two rows of cylindrical bearing rollers 14 that roll upon a hardened inner raceway sleeve 16 pressed onto the axle and which roll upon a hardened outer raceway sleeve 17 pressed into the journal box. The rollers of each row are peripherally spaced by a rotatable cage 18, and the rollers and cages of the two rows are axially spaced by an intermediate ring 19 supported by the outer raceway sleeve 17. A sealing ring 22, secured as by cap screws to the rearward end of the box, prevents lubricant leakage and has an annular hardened portion 23 extending within the raceway sleeve 17 radially beyond the separator 18 to engage and guide the inner row of rollers 14. Similarly, an annular projection 24 on a lubricator ring 26 seated in the journal box between the end of the raceway sleeve 17 and inwardly extending abutment ribs 27 (Figure 4) engages and guides the outer row of bearing rollers 14. The lubricator ring 26 which is held from turning by screws, one of which is shown at 29 (Fig. 3), receives oil from the bearing rollers and directs it through a passage 30 and an inclined lip 32 into a pan 33 extending from an inclined lid 34 normally closing an opening 35 in the top of the journal box and demountably clamped against a suitable gasket as by cap screws. Oil in the pan 33 drains through a hole 36 onto an inclined lip 40 on the top of a thrust block 42 from which the oil flows into a thrust block pocket 43 communicating with an eccentric lubricating groove 45 cut in the end of a circular facing member 47 engageable with the end of the axle 10. The facing member 47, which is cast upon the thrust block 42, is composed of bronze or other suitable material having a low coefficient of friction against steel in the presence of lubricant, and has a flat axle-engaging face 49 preferably of the same size as the flat axle end. The distance from the face 49 to a witness groove peripherally cut in the facing member 47 may be measured occasionally to determine the extent of facing member wear.

The thrust block 42 has a central forwardly extending projection 50 from which a pair of similar side arms 52 extend laterally in opposite directions, each arm terminating in a forwardly extending foot 54 having an arcuate end face 56 and loosely supported by the top and bottom walls of a rectangular recess 57 longer than the foot to provide for the required endwise movement of the thrust block under endwise axle thrust. The engagement of the feet 54 against end walls 59 of these recesses position the face 49 normally in desired spaced relation to the axle end. Each recess 57 is formed in the inner end of a swivel bushing 58 journalled in a bore 60 through the side of the box 12 and demountably held in position by a detachable cover plate 61 suitably fastened, as by screws, to the side of the box. An annular swivel bushing flange 65, seated in a counterbore at the outer end of each bore 60, limits inward movement of the bushings 58 and prevents cramping of these bushings against the arcuate end faces 56. Pins 66, secured in the forward end of the box 12, loosely enter swivel bushing slots 67 to limit the extent of rotatable or swivel movement of these bushings.

Figure 1:
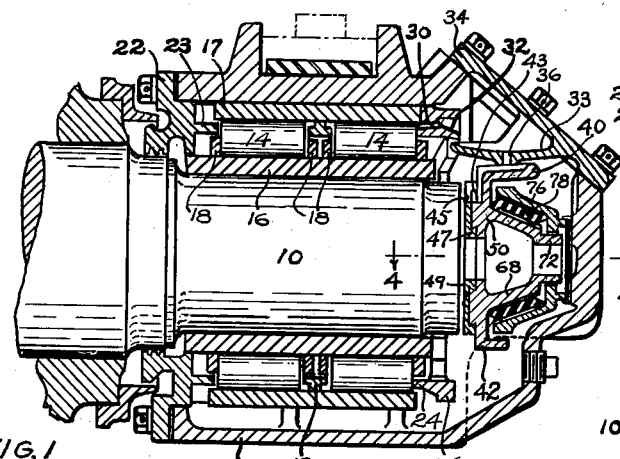
Figure 4:
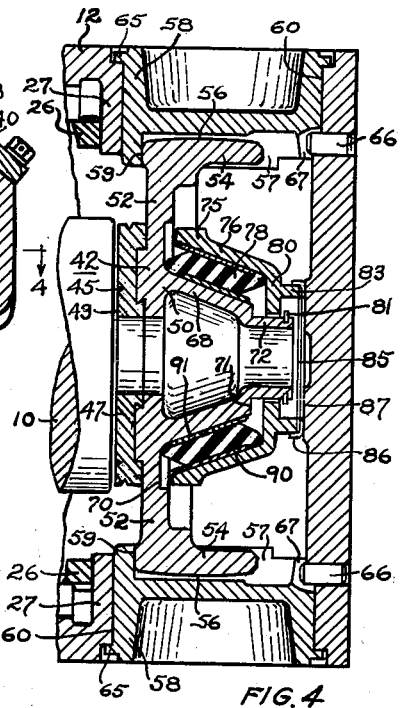
Figure 4 is an enlarged fragmentary horizontal section taken along the line 4—4 of Figure 1 and showing the thrust absorbing arrangement.
Figure 2:
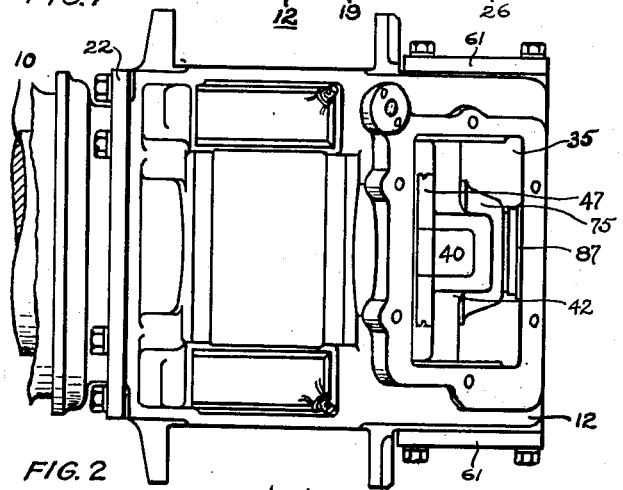
Figure 2 is a plan view of the journal box with the lid removed.
Figure 5:
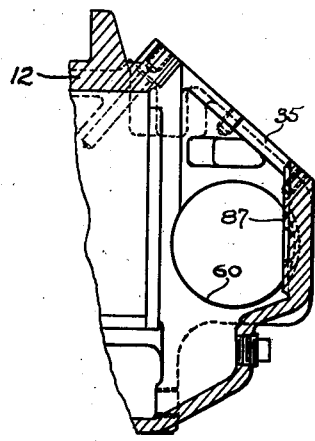
Figure 5 is a fragmentary longitudinal section of a portion of the box with the thrust absorbing arrangement removed.

The central portion 50, which is hollow to aid cooling and to reduce weight of the thrust block, has a conically tapering wall 69 extending from a flat annular face 70 and terminating at its smaller forward end in a shoulder 71 from which extends a cylindrical sleeve portion 72, the conical wall and sleeve portion being preferably coaxial with the axle 10. A holder or retainer, generally indicated at 75, has a conical wall 76 fitted over a conical annular cushion 78 that seats upon the conical thrust block wall 69. A radially inwardly extending wall 80 at the smaller end of the conical wall 76 is centrally bored to surround the sleeve portion 72 in spaced relation and is located in spaced relation to the shoulder 71 and spaced from a snap ring 81 demountably secured on the end of the sleeve portion 72 to hold the parts together as a unit handling thrust assembly. An annular projection 83 extending from the wall 80 and beyond the end of the sleeve portion 72 has a flat annular end face against which shims 85 are held by a cap 86 demountably fitted over the projection 83 and engaging a boss 87 in the end wall of the journal box 12 (Figure 4).

The conical cushion 78 comprises an annulus of synthetic rubber or other suitable yieldable material inherently and deformably resilient in all directions and which will not deteriorate in the presence of oil. Conical outer and inner metal reinforcing sleeves 90 and 91 are permanently bonded as by cement or vulcanization to the outer and inner conical walls of the cushion, these sleeves seating respectively against the conical walls 76 and 68. The outer cushion periphery terminates in an annular nose portion engaging the radial wall 80 and the inner cushion periphery terminates in a similar nose portion engaging the face 70. Each of these reinforcing sleeves terminates at one end in spaced relation to the nose portion which continues therefrom and at its other end extends beyond the cushion. The aggregate thickness of the shims 85 is preferably chosen to provide an initial preload on the cushion 78 which locates the thrust block 42 against the recess walls 59. Under end thrust of the axle 10 against the thrust block, the ends of the cushion 78 first deform to yieldably absorb light endwise load. As the end thrust of the axle increases, this thrust is correspondingly and resiliently resisted as the cushion longitudinally deforms under a shear stress wherein the reinforcing sleeve 91 axially moves with respect to the reinforcing sleeve 90. Due to the swivel movements of the members 58 and the longitudinal and free tilting movements of the feet 54 lengthwise of the recesses 57, the resiliently deformable character of the cushion 78 assures an even engagement of the facing member 47 against the flat end of the axle 10. The extreme movement of the axle towards the thrust block is finally limited by the abutting of the sleeve portion 72 against the boss 87.

The thrust assembly is installed as a unit through the box opening 35 by vertically lowering the assembly into the box with one of the feet 54 entered first, the swivel bushings 58 and cover plates 61 having been removed. After the assembly is completely entered, it is turned to locate both arms 52 horizontally. The swivel bushings 58 are then inserted in the bores 60 with the recesses 67 receiving the pins 66 and the feet 54 are located in the recesses 57 after which the cover plates 61 are secured in position. If necessary, a suitable tool such as a small bar may be used between the rim of the opening 35 and the arms 52 to overcome the initial preload in entering the feet 54 in their respective recesses.

We claim:

1. In a journal box having an axle journalled for rotation and axially shiftable therein, a thrust block normally spaced from the end of the axle and engageable therewith to receive axle thrust, laterally extending arms on the thrust block, members demountably positioned in the sides of the box and slidably supporting said arms for movement longitudinally of the axle, a holder engaging an end wall of the box, and a yieldable cushion carried by the holder and engaging the thrust block.

2. In a journal box having an axle journalled for rotation and axially shiftable therein, a thrust block normally spaced from the end of the axle and engageable therewith to receive axle thrust, laterally extending arms on the thrust block, supporting members demountably received in the sides of the box, an end on each arm being demountably received in and tiltable and slidable in one of the supporting members, a holder surrounding a portion of the thrust block and abutting an end wall of the box, and a resilient cushion between the holder and the thrust block.

3. In a journal box having an axle journalled for rotation and axially shiftable therein, a thrust block normally spaced from the end of the axle and engageable therewith to receive axle thrust, laterally extending arms on the thrust block, supporting members demountably secured in the sides of the box, the ends of the arms being slidably mounted within and supported by said supporting members for movement endwise of the axle, a thrust block projection extending from said arms, a holder spaced from said projection and engageable with an end wall of the box, and a resiliently yieldable cushion mounted within the holder and seated against the thrust block projection.

4. In a journal box having an axle journalled for rotation and axially shiftable therein, a thrust block normally spaced from the end of the axle and engageable therewith to receive axle thrust, laterally extending arms on the thrust block, supporting members demountably journalled in the sides of the box and slidably supporting an end of each arm for movement endwise of the axle, an annular thrust block projection extending from the arms, an annular holder surrounding the thrust block projection and abutting against an end wall of the box, a resilient annular cushion between the holder and the thrust block, and means adjustably locating the holder with respect to the thrust block.

5. In a journal box having an axle journalled for rotation and axially shiftable therein, a thrust block normally spaced from the end of the axle and engageable therewith to receive axle thrust, laterally extending arms on the thrust block, a thrust block projection, members demountably secured in the sides of the box and slidably supporting the end of the arms for movement endwise of the axle, a holder surrounding the thrust block projection and engaging an end wall of the box, a resiliently deformable cushion member between the holder and the projection, and means securing the thrust block cushion and holder together as a unit-handling assembly.

6. In a journal box having an axle journalled for rotation and axially shiftable therein, a thrust block normally spaced from the end of the axle and engageable therewith to receive endwise axle thrust, laterally extending arms on the thrust block, a pair of swivel members demountably journalled in the sides of the box and having recesses opening towards each other, end portions on the arms non-rotatably and slidably received in the recesses for movement endwise of the axle, a holder engaging an end wall of the box, and a yieldable cushion carried by the holder and engaging the thrust block.

7. In a journal box having an axle journalled for rotation and axially shiftable therein, a thrust block normally spaced from the end of the axle and engageable therewith to receive endwise axle thrust, laterally extending arms on the thrust block, coaxial swivel members demountably journalled in the sides of the box, means on the swivel members supporting the ends of the arms for slidable movement endwise of the axle, mechanism limiting the extent of rotatable movement of the swivel members, a holder engaging an end wall of the box, and a yieldable cushion carried by the holder and engaging the thrust block.

8. In a journal box having an axle journalled for rotation and axially shiftable therein, a thrust block normally spaced from the end of the axle and engageable therewith to receive and limit endwise axle thrust, laterally extending arms on the thrust block, members demountably secured in the sides of the box and slidably supporting the ends of the arms for movements lengthwise of the axle, a holder engaging an end wall of the box, a yieldable cushion carried by the holder and engaging the thrust block, and a thrust block projection engageable with the end wall of the box to limit the extent of thrust block movement.

9. In a journal box having an axle journalled for rotation and axially shiftable therein, a thrust block normally spaced from the end of the axle and engageable therewith to receive and limit endwise axle thrust, laterally extending arms on the thrust block, members demountably secured in the sides of the box and loosely supporting the ends of the arms for movements endwise of the axle, a holder engaging an end wall of the box, a resiliently deformable cushion carried by the holder and engaging the thrust block, and a thrust block projection extending through the holder and the cushion and engageable with said end wall to limit the extent of endwise axle movement towards the thrust block.

10. In a journal box having an axle journalled for rotation and axially shiftable therein, a thrust block normally spaced from the end of the axle and engageable therewith to receive axle thrust, laterally extending arms on the thrust block, members demountably positioned in the sides of the box and slidably supporting the arms for movements endwise of the axle, a holder engaging an end wall of the box, a resiliently deformable cushion within the holder and engaging the thrust block, and means deforming the cushion under an initial preload between the holder and the thrust block.

11. In a journal box having an axle journalled for rotation and axially shiftable therein, a thrust block normally spaced from the end of the axle and engageable therewith to receive endwise axle thrust, laterally extending arms on the thrust block, members demountably fitted in the sides of the box and slidably supporting the ends of the arms for movements endwise of the axle, walls in said members limiting the extent of movement of the thrust block towards the axle, a holder engaging an end wall of the box, a resiliently deformable cushion within the holder and engaging the thrust block under a predetermined preload, and adjustable spacing means between the holder and the box to adjust said preload.

12. In a journal box having an axle journalled for rotation and axially shiftable therein, a thrust block normally spaced from the end of the axle and engageable therewith to receive axle thrust, laterally extending arms on the thrust block, opposed supporting members demountably secured in and respectively projecting through each side of the box, a foot on the end of each arm, said feet being respectively received in recesses in the supporting members, said recesses having walls supporting the feet for slidable movements longitudinally of the axle, a projection on the thrust block, a holder surrounding said projection in spaced relation and engageable with an end wall of the box, and a yieldable cushion seated within the holder and seated upon the thrust block projection.

13. In a journal box having an axle journalled for rotation and axially shiftable therein, a thrust block normally spaced from the end of the axle and engageable therewith to receive endwise axle thrust, laterally extending arms on the thrust block, bushings demountably secured in the sides of the box, the ends of the arms being slidably and tiltably mounted in the bushings for movements endwise of the axle, a conical thrust block projection extending from said arms, a holder having a conical wall surrounding the projection, an end portion of the holder engaging an end wall of the box, and a resiliently yieldable conical cushion between the conical wall and said conical thrust block projection.

14. In a journal box having an axle journalled for rotation and axially shiftable therein, a thrust block normally spaced from the end of the axle and engageable therewith to receive endwise axle thrust, laterally extending arms on the thrust block, bushings demountably secured in the sides of the box and slidably supporting the ends of the arms for movements endwise of the axle, a conical thrust block projection extending from said arms, a holder having a conical wall surrounding the conical projection, an end portion of the holder resting against an end wall of the box, a conical cushion interposed between the conical projection and the conical holder wall, and said cushion comprising an inherently resilient member to which are bonded inner and outer reinforcing sleeves.

15. In a journal box having an axle journalled for rotation and axially shiftable therein, a thrust block normally spaced from the end of the axle and engageable therewith to receive and limit endwise axle thrust, laterally extending arms on the thrust block, supporting members demountably secured in the sides of the box and slidably supporting the ends of the arms for movements endwise of the axle, a conical thrust block projection extending from said arms, an annular holder having a conical wall surrounding the projection in spaced relation, an end portion of the holder abutting an end wall of the box, a resiliently yieldable conical cushion seated over the conical projection and against the conical wall, and a thrust block extension engageable with the end wall of the box to limit the extent of endwise axle movement.

16. In a journal box having an axle journalled for rotation and axially shiftable therein, a thrust block normally spaced from the end of the axle and engageable therewith to receive endwise axle thrust, laterally extending arms on the thrust block, bushings demountably journalled in the sides of the box, the ends of the arms being slidably mounted in the bushings for movements endwise of the axle, a conical thrust block projection extending from said arms, a holder having a conical wall surrounding the projection, an end portion of the holder engaging an end wall of the box, and a resiliently yieldable conical cushion between the conical projection and the conical wall and having its ends respectively engaging opposed substantially parallel walls on the thrust block and on the holder.

17. In a journal box having an axle journalled for rotation and axially shiftable therein, a thrust block normally spaced from the end of the axle and engageable therewith to receive endwise axle thrust, laterally extending arms on the thrust block, supporting members demountably secured in the sides of the box and supporting the ends of the arms for slidable movement lengthwise of the axle, a conical thrust block projection extending from said arms, a holder, a conical holder wall surrounding the conical projection, an end portion on said holder abutting against an end wall of the box, a conical cushion interposed between the conical projection and the conical holder wall, said cushion including a resiliently deformable member to which is bonded inner and outer reinforcing conical sleeves, the outer sleeve having its smaller end spaced inwardly from the smaller cushion end, and the inner sleeve having its larger end spaced inwardly from the larger end of the cushion.

18. In a journal box having an axle journalled for rotation and axially shiftable therein, a thrust block normally spaced from the end of the axle and engageable therewith to receive endwise axle thrust, laterally extending arms on the thrust block, a pair of coaxial swivel members journalled respectively in the side walls of the box, each swivel member demountably receiving an end of an arm for slidable movement endwise of the axle, means limiting the swivel movement of the swivel members, a thrust block projection having a conical wall, an annular holder engaging against an end wall of the box and having a conical wall surrounding the conical thrust block wall, a resiliently deformable conical cushion fitted between the conical walls under compression, rounded ends on the cushion respectively abutting opposed faces on the holder and on the thrust block, means holding the thrust block cushion and holder together as a unit handling structure, and a thrust block extension engageable with the end wall of the box to limit the extent of endwise axle movement.

RICHARD J. BRITTAIN, JR.
CHARLES W. KIEN.

References Cited in the file of this patent

UNITED STATES PATENTS

| Number | Name | Date |
| --- | --- | --- |
| 2,273,308 | Young | Feb. 17, 1942 |
| 2,292,607 | Brittain | Aug. 11, 1942 |
| 2,568,530 | Willison | Sept. 18, 1951 |